(12) United States Patent
Borkar et al.

(10) Patent No.: US 10,021,743 B2
(45) Date of Patent: Jul. 10, 2018

(54) LIGHT DEVICES HAVING CONTROLLABLE LIGHT EMITTING ELEMENTS

(71) Applicant: Intel Corporation, Santa Clara, CA (US)

(72) Inventors: Shekhar Y. Borkar, Beaverton, OR (US); Stephen G. Eichenlaub, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 35 days.

(21) Appl. No.: 15/365,484

(22) Filed: Nov. 30, 2016

(65) Prior Publication Data

US 2017/0086271 A1    Mar. 23, 2017

Related U.S. Application Data

(63) Continuation of application No. 14/069,283, filed on Oct. 31, 2013, now Pat. No. 9,516,712, which is a
(Continued)

(51) Int. Cl.
*H05B 37/02* (2006.01)
*H05B 33/08* (2006.01)
(Continued)

(52) U.S. Cl.
CPC ......... *H05B 33/0815* (2013.01); *F21K 9/232* (2016.08); *F21K 9/233* (2016.08);
(Continued)

(58) Field of Classification Search
CPC ............ H05B 33/0815; H05B 33/0818; H05B 37/02; H05B 33/08; H05B 33/083;
(Continued)

(56) References Cited

U.S. PATENT DOCUMENTS 1,359,581 A    7/1917  Dodds
3,449,619 A    6/1969  Stalp
(Continued)

FOREIGN PATENT DOCUMENTS

CN    101155446 A    4/2008
DE    202005006053 U1    6/2005
(Continued)

OTHER PUBLICATIONS

Office Action dated Jan. 3, 2017 for Chinese Application No. 201510023732.7, 17 pages.
(Continued)

*Primary Examiner* — Douglas W Owens
*Assistant Examiner* — Wei Chan
(74) *Attorney, Agent, or Firm* — Schwabe, Williamson & Wyatt, P.C.

(57) ABSTRACT

In some embodiments, a light device for generating light includes light emitting diodes (LEDs), and power supply circuitry including at least one switching regulator including switching elements to provide power to the LEDs. The light device includes a device support structure including a device connector and an LED support to support the LEDs, wherein the device connector is one end of the device support structure, and the power supply circuitry is supported by the device support structure. Other embodiments are described.

22 Claims, 12 Drawing Sheets

Related U.S. Application Data continuation of application No. 12/493,023, filed on Jun. 26, 2009, now Pat. No. 8,573,807.

(51) Int. Cl.
| | |
|---|---|
| *F21K 9/232* | (2016.01) |
| *F21K 9/233* | (2016.01) |
| *F21Y 101/00* | (2016.01) |
| *F21Y 115/10* | (2016.01) |
| *F21Y 113/13* | (2016.01) |
| *F21K 9/238* | (2016.01) |
| *F21K 9/235* | (2016.01) |
| *F21V 3/02* | (2006.01) |

(52) U.S. Cl.
CPC ..... *H05B 33/0818* (2013.01); *H05B 33/0845* (2013.01); *H05B 33/0857* (2013.01); *H05B 37/0245* (2013.01); *H05B 37/0272* (2013.01); *F21K 9/235* (2016.08); *F21K 9/238* (2016.08); *F21V 3/02* (2013.01); *F21Y 2101/00* (2013.01); *F21Y 2113/13* (2016.08); *F21Y 2115/10* (2016.08); *Y02B 20/19* (2013.01); *Y02B 20/383* (2013.01)

(58) Field of Classification Search
CPC ............ H05B 33/0866; H05B 33/0803; H05B 33/0842; H05B 33/0848; H05B 33/0845; H05B 37/0245; H05B 33/0809; H05B 33/086; H05B 33/0884
USPC ....... 315/224, 307, 291, 308, 312, 201, 302, 315/122
See application file for complete search history.

(56) References Cited

U.S. PATENT DOCUMENTS

| | | | |
|---|---|---|---|
| 5,576,680 | A | 11/1996 | Ling |
| 6,747,420 | B2 | 6/2004 | Barth et al. |
| 6,948,829 | B2 | 9/2005 | Verdes et al. |
| 7,321,203 | B2 | 1/2008 | Marosek |
| 7,358,679 | B2 | 4/2008 | Lys et al. |
| 7,393,119 | B2 | 7/2008 | Lebens et al. |
| 7,403,107 | B2 | 7/2008 | Ito et al. |
| 7,682,037 | B1 | 3/2010 | Hose et al. |
| 7,880,400 | B2 | 2/2011 | Zhou et al. |
| 7,980,728 | B2 | 7/2011 | Ramer et al. |
| 7,902,773 | B2 | 8/2011 | Shiotsu et al. |
| 7,997,745 | B2 | 8/2011 | Van De Ven et al. |
| 2005/0237005 | A1 | 10/2005 | Maxik |
| 2006/0215422 | A1 | 9/2006 | Laizure et al. |
| 2007/0133199 | A1 | 6/2007 | Lebens et al. |
| 2007/0229250 | A1* | 10/2007 | Recker ................. G08B 5/36 340/531 |
| 2008/0150450 | A1 | 6/2008 | Starr et al. |
| 2008/0304249 | A1* | 12/2008 | Davey ............. F21V 23/0442 362/20 |
| 2009/0230880 | A1* | 9/2009 | Wang ............... H05B 33/0815 315/294 |

FOREIGN PATENT DOCUMENTS

| | | |
|---|---|---|
| JP | 2008250771 A | 9/1996 |
| JP | 2001272938 A | 5/2001 |
| JP | 2002244103 A | 8/2002 |
| JP | 2004111104 A | 8/2004 |
| JP | 2007189004 A | 7/2007 |
| JP | 2008103112 A | 5/2008 |
| WO | WO2009033051 A1 | 3/2009 |

OTHER PUBLICATIONS

Office Action for Chinese Application No. 201010221480.6, dated Jan. 6, 2012.
Office Action for Chinese Application No. 201010221480.6, dated Sep. 7, 2012.
Office Action for Chinese Application No. 201010221480.6, dated Mar. 18, 2013.
Office Action for Chinese Application No. 201010221480.6, dated Jul. 22, 2013.
Office Action for Chinese Application No. 201010221480.6, dated Dec. 23, 2013.
Office Action for Japanese Application No. 2010-113613, dated Jun. 5, 2012.
Office Action for Japanese Application No. 2010-113613, dated Oct. 16, 2012.
Office Action for Taiwan Application No. 99114206, dated Jun. 13, 2013, 21 pages.
Office Action for Taiwan Application No. 99114206, dated Nov. 6, 2013, 5 pages.
Wu, Jien-Yi, "Candlepower Distribution Measurement for LED Luminaire," MS Thesis, Graduate Institute of Electrical Engineering, Cheng Shiu University, Jun. 27, 2007, 36 pages. (English Language Abstract provided).
Datasheet, "LTM4600-10A High Efficiency DC/DC uModule," Linear Technology, 2006, 12 pages.
Chen, Ming-Cheng, Remote Control on the Mixing RGB Colors of LED Light Bulbs, MS Thesis, Graduate Institute of Electrical Engineering, Southern Taiwan University of Science and Technology, Jun. 2006, 36 pages. (English Language Abstract provided).
Office Action dated Feb. 12, 2014 for German Patent Application No. 102010019228.7-34, 9 pages.
Office Action dated May 6, 2014 for Chinese Patent Application No. 201010221480.6, 7 pages.
Non-Final Office Action dated Sep. 13, 2011 for U.S. Appl. No. 12/493,023, 18 pages.
Final Office Action dated Feb. 15, 2012 for U.S. Appl. No. 12/493,023, 15 pages.
Non-Final Office Action dated May 23, 2012 for U.S. Appl. No. 12/493,023, 13 pages.
Final Office Action dated Dec. 10, 2012 for U.S. Appl. No. 12/493,023, 12 pages.
Notice of Allowance dated Jul. 5, 2013 for U.S. Appl. No. 12/493,023, 13 pages.
Non-Final Office Action dated Jan. 25, 2016 for U.S. Appl. No. 14/069,283, 15 pages.
Notice of Allowance dated Aug. 12, 2016 for U.S. Appl. No. 14/069,283, 17 pages.
Office Action dated Jul. 17, 2017 for Chinese Application No. 201510023732.7, 18 pages.

\* cited by examiner

LIGHT DEVICES HAVING CONTROLLABLE LIGHT EMITTING ELEMENTS

CROSS REFERENCE TO RELATED APPLICATION

This application is a continuation of U.S. patent application Ser. No. 14/069,283 filed on Oct. 31, 2013, which is a continuation of U.S. patent application Ser. No. 12/493,023, filed Jun. 26, 2009 and issued on Nov. 5, 2013 as U.S. Pat. No. 8,573,807, both of which are entitled "LIGHT DEVICES HAVING CONTROLLABLE LIGHT EMITTING ELEMENTS," and which are herein incorporated by reference in their entirety.

BACKGROUND

Technical Field

Embodiments of the invention relate generally to light devices having controllable light emitting elements such as light emitting diodes (LEDs).

Background Art

LEDs are much more energy efficient and longer lasting than incandescent bulbs, or even fluorescent bulbs. However, a complaint regarding LED based light devices is that their luminance output is relatively low.

There are some LED based products available which look like a standard bulb base, but their luminance is very low, about 130 lumens, for example. Light output of about 1000 lumens may be needed to come close to some ordinary bulbs.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

In some embodiments, LEDs are used for household or light commercial lighting devices, by embedding the LEDs and associated electronics in mechanical packaging that include a conventional incandescent light bulb plug, so that they fit in conventional, incandescent or compact fluorescent light sockets, for example, sockets found around the world. In some embodiments, the light device provides the same or similar luminance output to of an incandescent light, and in some embodiments, this is done with substantially less power input. For example, an LED light bulb according to some embodiments of the invention will fit into a conventional 110V (or 220V) light socket, or other conventional sockets, perhaps without the consumer even noticing the difference. In some embodiments, a bulb covering or encapsulation or other package, perhaps made of some organic or inorganic material, efficiently spreads the light, and gives the feeling of a conventional incandescent or fluorescent light bulb. In other embodiments, the details are different.

Figure 1:
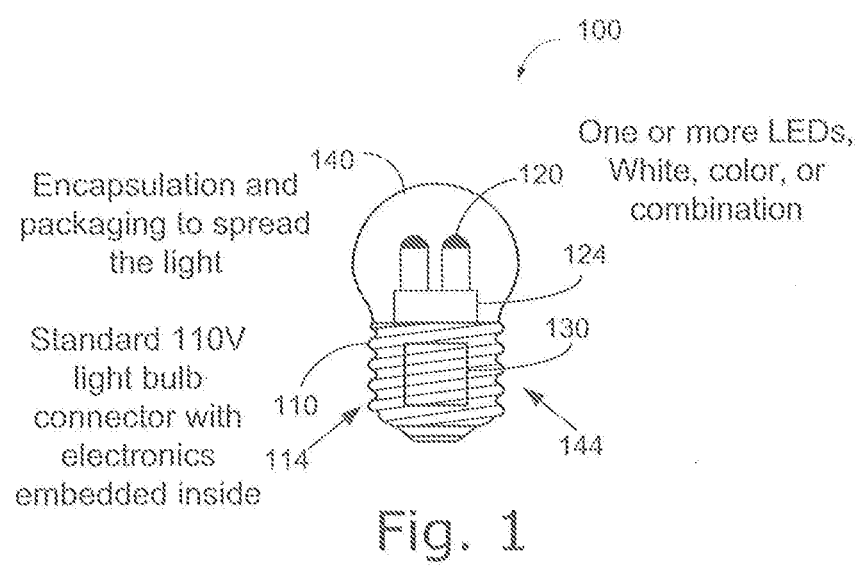
FIG. 1 is a diagram of a light device according to some embodiments of the invention.
Figure 17:
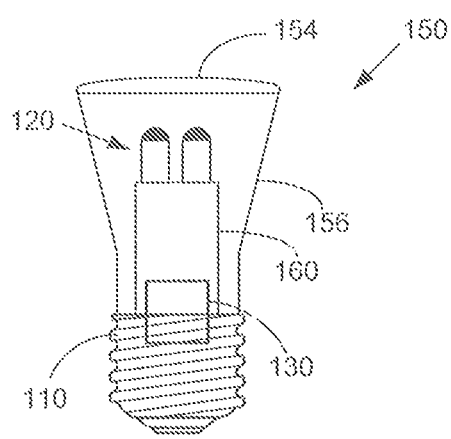
FIG. 17 illustrates a light device with a fully enclosed covering including transparent and non-transparent portions according to some embodiments of the invention.
Figure 18:
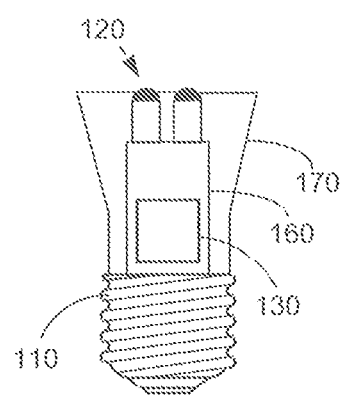
FIG. 18 illustrates a light device with a partially enclosed covering according to some embodiments of the invention.

FIG. 1 illustrates a light device 100 including one or more LEDs 120 and a light bulb connector 110, which may also be called a light device connector, a bulb plug, or a base. LEDs 120 are supported by an LED support 124. In other embodiments, support 124 does not extend beyond bulb connector 110. Connector 110 includes threads 114 to allow it to mate with a socket. Power is provided from the socket to connector 110. Connector 110 is at one end of the light bulb (or light device). Power supply circuitry 130 provides power to LEDs 120 and is included in bulb connector 110 and/or elsewhere in device 100. For example, in FIG. 17, power supply circuitry 130 is partially in connector 110 and partially in covering 150 and, more particularly, partially in support 160. LED support 160 supports LEDs 120. In FIG. 18, power supply circuitry 130 is completely in LED support 160 or on support 160. The different placements of power supply circuitry 130 could be made with any of light devices shown in the figures.

LEDs 120 may be high brightness LEDs or another type of LEDs including currently available and future LEDs. In some embodiments, light device 100 includes a bulb covering or encapsulation 140. Connector 110 and support 124 are part of a device support structure 144 for LEDs and a power supply 130. Note that connector 110 is at one end of support structure 144. Bulb encapsulation 140 disperses or spreads light from the LEDs, which are typically highly directional. In some embodiments, the intent is for the light to be directional, so a light dispersing bulb is not included.

Figure 19:
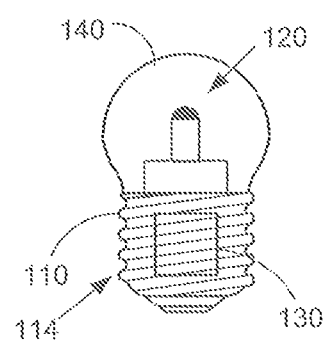
FIG. 19 illustrates a light device with a single LED according to some embodiments of the invention.

Although several of the figures show only two LEDs, LEDs 120 may include more than two LEDs in a light device. There may be different types of LEDs in the different light devices and there may be different types of LEDs in the same light device. FIG. 19 shows a light device with only one LED 120. Note that power supply circuitry 130 may be different if only one LED is used.

In some embodiments, there is not a covering or encapsulation. In some embodiments, a portion of the covering is non-transparent (for example, reflective), while another portion of the encapsulation is transparent or covering. For example, FIG. 17 illustrates a light device with a fully enclosed covering 150 having a transparent portion 154 and a non-transparent portion 156 to fully enclose LEDs 120. FIG. 1 also shows a fully enclosed covering. FIG. 18 shows a partially enclosed covering 170 because it leaves LEDs 120 exposed at the top. In FIG. 18, LEDs are shown partially extending above covering 170, but that does not matter as to whether the covering is fully or partially enclosed.

The invention is not restricted to use with light devices as are shown in FIG. 1. Various other shapes and sizes may be used. Light bulb connector 110 may be constructed to be of a standardized size to fit one of various standard sized sockets or it may be of a non-standard size. Examples of standard power for incandescent and fluorescent bulbs include 25 W, 40 W, 60 W, 75 W, and 100 W. Some embodiments of the invention allow the same, more than the same, or close to the same lumen output as the incandescent and fluorescent bulbs at substantially less power input. For example, some embodiments of light device 100 may provide the same lumens at less than half the input energy. Some embodiments of light device 100 work with a variety of voltages and range of voltages. For example, in some embodiments, the light device may work with a large range of input voltages from 90 to 250 V (volts) or, as another example, in some embodiments the input range may be 100 to 230V. This is In other embodiments, the light device may work with only a much more restricted range of input voltages. LEDs are one example of light emitting elements. Other examples of light emitting elements include small incandescent bulbs, that fit in a larger light device. As used herein, the term light is not restricted to the visible spectrum, but may include frequencies outside the visible spectrum.

A 100 W incandescent bulb may produce about 1500 (range about 1300 to 1700) lumens of light, and today's LEDs may provide about 60 (range about 50 to 70) lumens per watt, which is expected to increase as the technology matures. Therefore, you would need about 10 LEDs, each consuming 2.5 W, consuming total 25 W of electric power to provide the same output (lumens) as a 100 W incandescent bulb. The voltage drop across an LED may vary from 2 to 5 volts, depending on the type and the color of the LED. Notice that a single LED cannot be connected directly to the main supply voltage. If the voltage drop across an LED is about 5V, then the current through the LED is about 0.5 ampere, dissipating 2.5 W and producing about 150 lumens of light.

Figure 2:
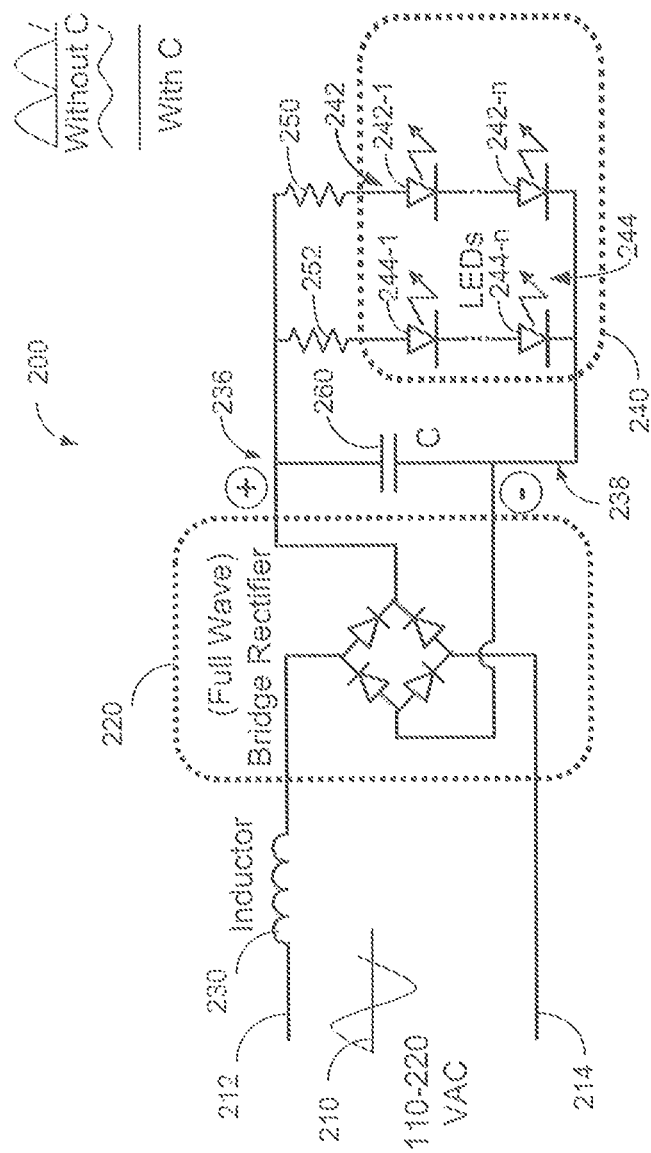
FIG. 2 is a block diagram of power supply circuitry and LEDs.

FIG. 2 illustrates power supply circuitry 200 to provide power to LEDs 240, including parallel groups of series LEDs 240 (242-1 . . . 242-n) and LEDs 244 (244-1 . . . 244-n). This implementation is not very efficient, but it is discussed here for the understanding of the concept. An AC supply voltage 210 is provided through input conductors 212 and 214 to a full wave bridge rectifier 220 in series with an inductor 230. Bridge rectifier 220 converts the alternating AC input signal into a direct DC signal. Inductor 230 acts as a ballast to drop sufficient voltage across it so that the rest of the system is fed with much lower voltage. The voltage drop across the inductor 230 may be proportional to the inductance of the inductor 230, with higher inductance providing a larger voltage drop, but resulting in a larger size of the inductor 230. Therefore, there is a practical limit to the size of the inductor 230 that can be employed. An inductor, such as inductor 230, is used in various embodiments to drop some voltage upfront before converting AC signal into DC. In other embodiments, an up front inductor like inductor 230 is not used.

Bridge rectifier 220 is coupled between inductor 230 and conductor 214 and between node 236 (+) and node 238 (-). A capacitor 260, coupled between nodes 236 and 238, acts as a filter to remove 50/60 Hz ripple and make the supply voltage closer to pure DC. The DC voltage across capacitor 260 may be as high as the peak value of the input voltage, for example, approximately 1.4 times input voltage (110V or 220V), about 150 or 300V, as the case may be. In our hypothetical case, assume LEDs 242 and 244 each have 10 LEDs in series, with 5V across each LED, so the total drop across the LEDs will be 50V. If ballast inductor 230 is not present, the rest of the voltage (e.g., 100 to 250V) is dropped across ballast resistors 250 and 252. The LEDs consume 25 W of power, and ballast resistors 250 and 252 consume 50 to 125 W of power, wasted as heat. If a ballast inductor 230 is present, the drop across the resistor 250 would be less depending on the inductance of the inductor 230.

Figure 3:
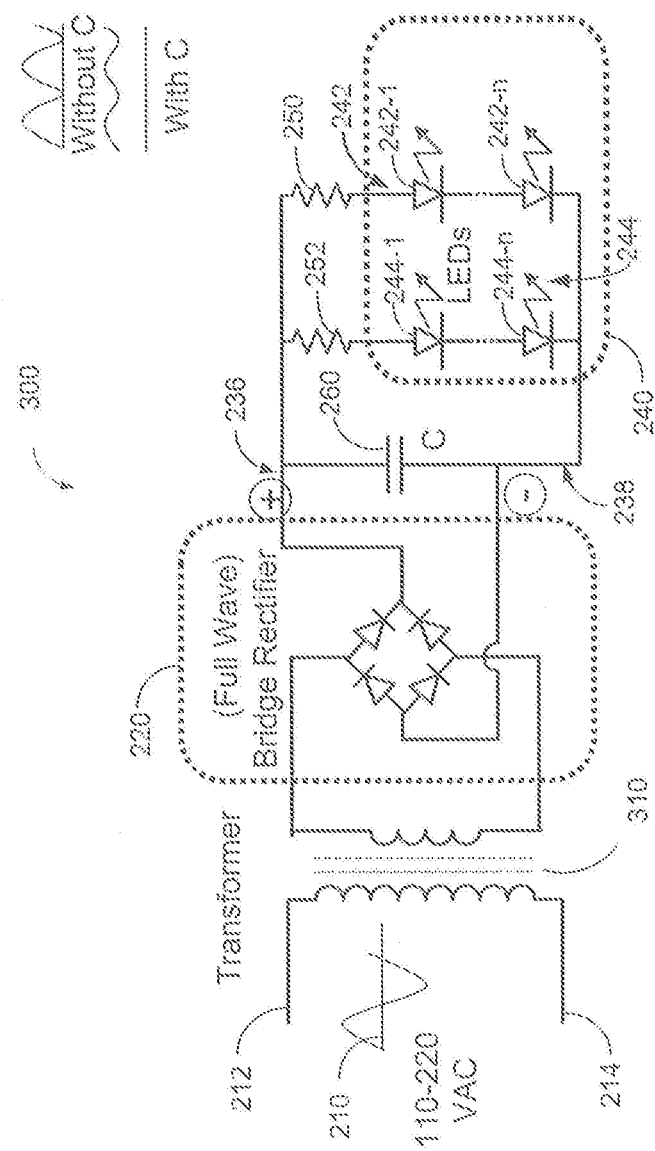
FIG. 3 is a block diagram of power supply circuitry and LEDs.

FIG. 3 is similar to FIG. 2 except that the power supply circuitry 300 includes a transformer 310 and not an inductor 230. However, transformers 310 tend to be bulky and heavy. It is note worthy that for both the designs of FIGS. 2 and 3, the same design cannot be used for both 110V and 220V. That is, a different value of inductor 230 would be used for 110V than for 220V, and a different value of transformer 310 would be used for 110V than for 220V. Power supply circuits 200 and 300 are prior art, although the inventors do not know for certain whether these precise power supply circuits have been used in connection with LED based standard-sized bulbs.

Figure 4:
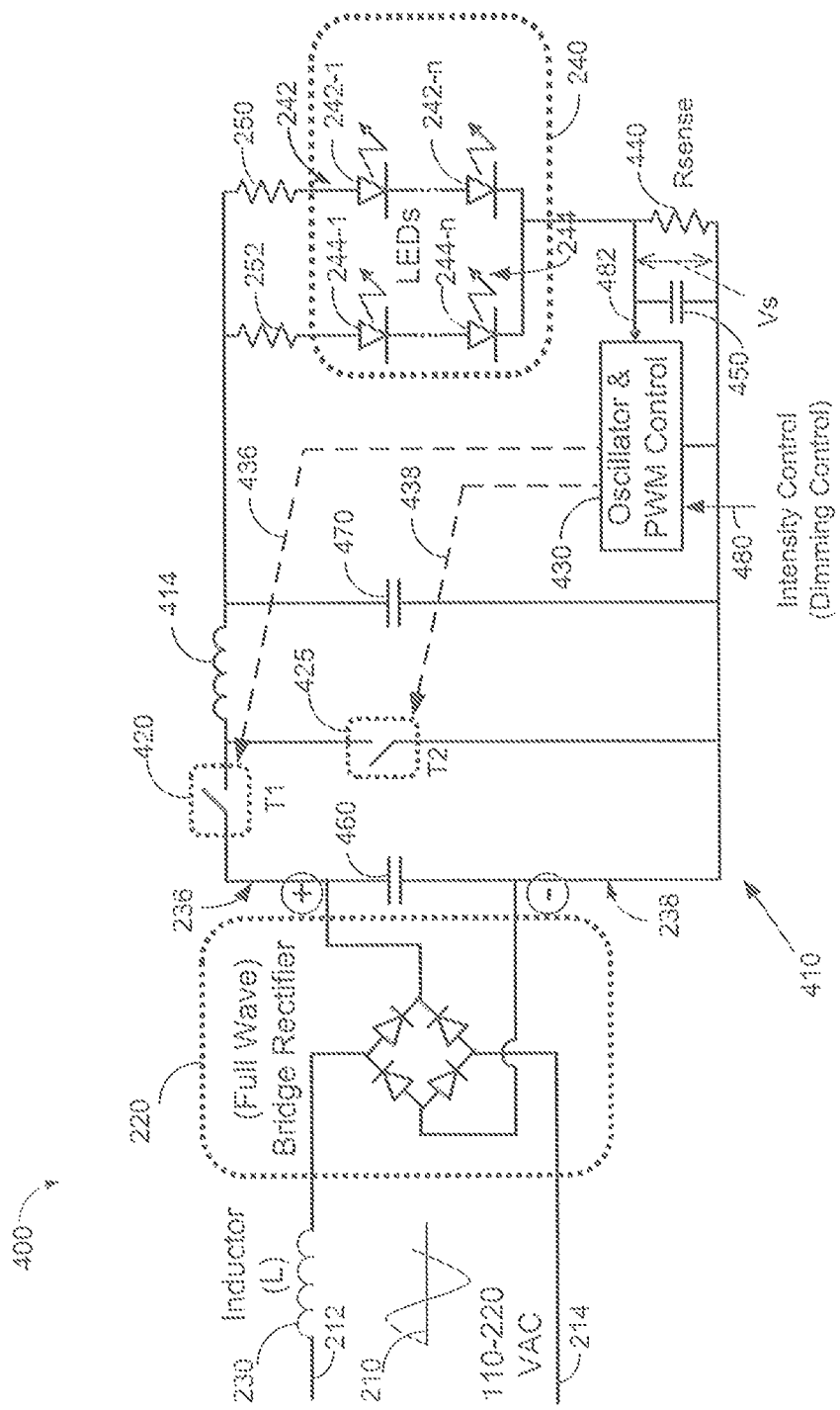
FIG. 4 is a block diagram of an LED based light system including a switched mode power supply with intensity control capabilities according to some embodiments of the invention.

FIG. 4 illustrates power supply circuitry 400 including a switching regulator 410 for providing power to LEDs 240. Switching regulator 410 incorporates a closed loop control, monitoring current consumption in LEDs 240 to regulate the current flowing through LEDs 240. Switching regulator 410 (sometimes called a Buck converter, switching converter, or switched mode power supply in the prior art) is coupled to nodes 236 and 238 and includes switching elements 420 and 425, capacitor 470, an inductor 414 (or inductors 414), resistor 440, capacitor 450, and switching control circuitry 430. Various types of switch mode power supplies are known in the art. Switching control circuitry 430 controls switching elements 420 and 425 through conductors 436 and 438. As examples, switching elements 420 and 425 may be high voltage bipolar or MOSFET transistors T1 and T2. The use of two transistors is illustrative and not intended to be limiting. Similar circuits may use one transistor and one diode or different combinations of transistors and diodes. For example, in some embodiments, element 420 is a transistor and element 425 is a diode.

In operation, the high voltage AC input at conductors 212 and 214 is converted to DC using conventional full wave bridge rectifier 220. Ballast inductor 230 drops some voltage before it is converted to DC. The DC voltage is filtered by the capacitor 460 between nodes 236 and 238 to remove or at least reduce AC ripple. Removing ripple from signals is well known.

When T1 is on, T2 is off and vice versa. When T1 is on, it conducts, and T2 is turned off creating an open circuit, and vice versa. When T1 is turned on, the inductor 414 is connected between the high DC voltage and low output voltage, and magnetic flux is built in inductor 414. When T1 is turned off and T2 is on, the current through inductor 414 continues to capacitor 470, and to LEDs 240. Resistors 250 and 252 in series with LED strings 242 and 244 may be very low resistance and act as a ballast to compensate for mismatches in the LED characteristics, and could be omitted if only one string of LEDs 240 is used.

A resistor 440 may be a precision resistor of very small resistance value Rsense. The voltage dropped across resistor 440 is filtered by a small capacitor 450 to reject ripples and average out the signal. This voltage Vs is a measure of the current flowing through LEDs 240, and is fed on conductor 482 to switching control circuitry 430.

The output voltage of switching regulator 410 may be responsive to the number of LEDs 240 in LED strings 242 and 244. The number of LEDs in a string and the number of strings given a desired light output may be chosen by known engineering tradeoffs.

In some embodiments, switching control circuitry 430 receives an intensity control signal on conductor(s) 480 discussed in connection with FIG. 7. In some embodiments, such as in FIG. 11, intensity control is through manual operation and a conductor 480 is not used. In other embodiments, there is no such intensity control. Intensity control allows the brightness of some or all of the LEDs to be controlled and is described in more detail below. This may also be called dimming control. An internal intensity control signal such as on conductor 480 can be responsive an external intensity control signal.

Figure 5:
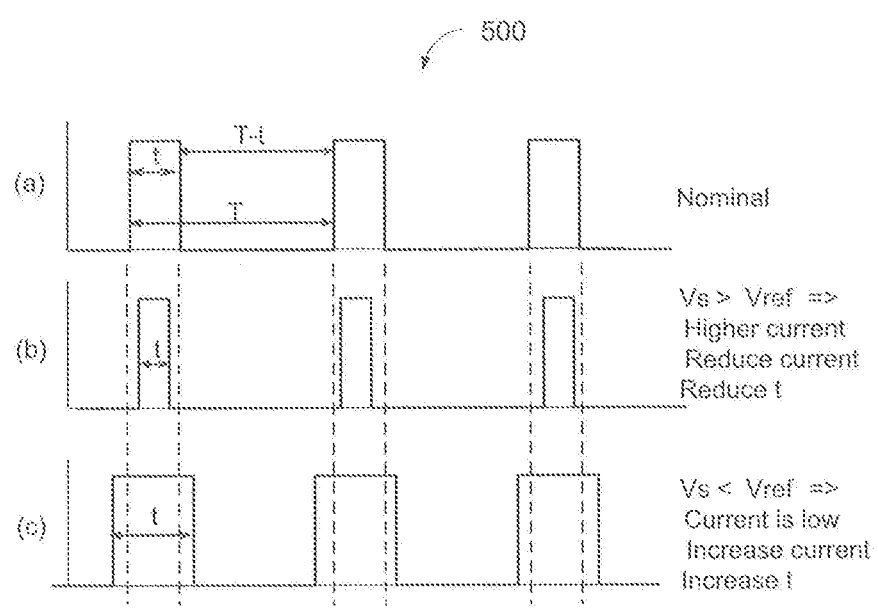
FIG. 5 is a diagram showing pulse width modulation (PWM) for regulating current.

FIG. 5 shows an effect of closed loop feedback system with pulse width modulation, which is known in the art. In some embodiments, the frequency of operation is held constant, thus the period T is fixed. In case (a), during nominal operation, inductor 414 builds magnetic flux during time t and continues to provide current capacitor 470 and LEDs 240 during time T-t. In case (b), the sensed voltage Vs is higher than reference Vref indicating that higher current is flowing through LEDs 240, and thus time t is reduced. Similarly, in case (c), the current through LEDs 240 is increased by building higher current in inductor 414 by increasing time t.

In FIG. 5, the frequency is constant and the duty cycle is changed by varying the pulse width. Under a second approach, the duty cycle may be changed by keeping the pulse width constant and changing the period (frequency). Under a third approach, the duty cycle is held constant, but the frequency changes. The second and third approaches may cause changes in ripple, but this is a known design tradeoff. Still alternatively, both the frequency and the pulse width could be changed.

Figure 6:
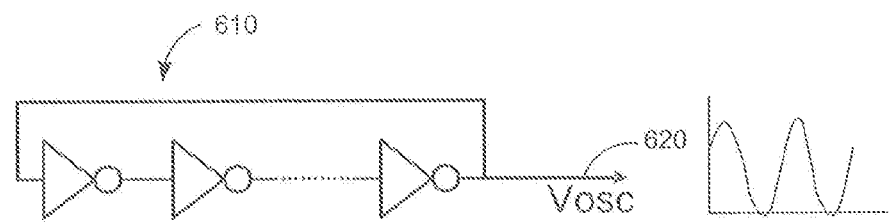
FIG. 6 is a block diagram of a prior art ring oscillator.

FIG. 6 shows an embodiment of a free running oscillator 610 with output signal Vosc on conductor 620. The output of the ring oscillator 620 is a close to sinusoidal voltage signal as shown in FIG. 6. A simple ring oscillator may be stable enough since switching control circuitry 430 may adjust the duty cycle to compensate for changes in the Vosc frequency.

Figure 7:
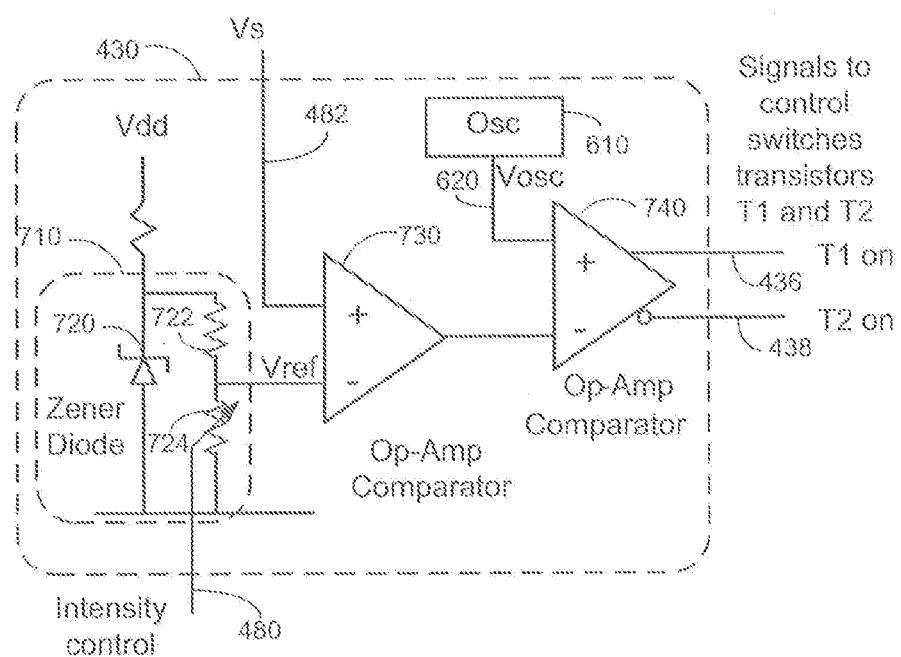
FIG. 7 is a block diagram of a pulse width modulator (PWM) that may be used in some embodiments of the invention.

FIG. 7 shows one of the various ways to implement switching control circuitry 430. Switching control circuitry 430 includes an oscillator 610, which may be the same as or different than the oscillator of FIG. 6, to provide the signal Vosc on conductor 620 to a positive input of comparator 740. A negative input of comparator 740 is from the output of a comparator 730 which receives the sensed voltage Vs and a reference voltage signal Vref as inputs. Feedback circuitry to control the gain of the comparators is known in the art and is not shown to avoid clutter. The Vref signal is provided by a precision voltage reference circuit 710. In the example of FIG. 7, voltage reference circuit 710 includes a simple Zener diode 720 and resistors 722 and 724 to create the Vref signal. It is well known in the art to use a Zener diode and resistors to create a voltage reference. There are several other more complex ways of creating voltage reference known in the art, such a using band-gap reference. In some embodiments in which there is intensity control, resistor 724 is a variable resistor or group of resistors. Resistor 724 can be a potentiometer or similar device in which the resistance is change through manual control as in FIG. 11. Alternatively, resistor 724 can be changed in response to changing signals in conductor(s) 480. For example, a signal on conductor 480 could control switches causing one or more additional resistors to be in parallel thereby changing the resistance. Note that conductor 480 is not included in some embodiments. In some embodiments, Vref could be provided directly from conductor 480 so that the other reference circuitry 710 is not used to create Vref.

Comparator 730 compares the sensed voltage Vs to the reference voltage Vref and creates a trip point of the next comparator 740. Comparators 730 and 740 may be operational amplifiers. Comparator 740 creates strobe pulses t (discussed in connection with FIG. 5) whose width depends on the output of comparator 730. If comparator 730 determines that the current through LEDs 240 is too low, then the pulse width t 520 is increased, and vice versa.

In the illustrated embodiments, if Vs is higher than Vref, the current through LEDs 240 is higher than desired, and the control system takes action by reducing the time T1 is on. Lower on time for T1 results in lower current build up in inductor 410. Similarly, if Vs is lower than Vref, the control system increases the ON time of T1 420, and so on. This closed loop feedback system continuously monitors the current through LEDs 240, and takes action to maintain the brightness of LEDs 240 at the desired level. When intensity control is used, Vref can be adjusted. If Vref is increased, the current through LEDs 240 is increased. Therefore, the illustrated control circuit 430 provides an integrated intensity control. Accordingly, switching control circuitry 430 is a pulse width modulator that controls the width of the pulse t to compensate for shifts in currents and voltages. The implementation shown here is analog. It is possible to create a digital design if so desired. Pulse width modulation is a well known method to control voltage and current and in controlling LED brightness.

A relationship exists between the input DC voltage V and output DC voltage v, where the change in current in the inductor 414 during time t is $\Delta I=(V-v)t/L$ (the current built in inductor 414), where L is the inductance of inductor 414. Likewise, the current in inductor 414 during the time (T-t) is $\Delta I=v(T-t)/L$ (the current discharged from inductor 414). Equating the two yields $t/T=v/V$. Therefore, the ratio of the output voltage to the input voltage is proportional to the duty cycle of the switching waveform (t/T) during continuous current operation. The control system may adjust the duty cycle continuously to adjust the voltage v to maintain the desired current in LEDs 240. Note that these and other equations in this description are models for the operation and not necessarily exact descriptions of the operation.

As an example, if the design is for nominal 110V AC, then the input DC voltage is about 150V, an LED chain 242 requires 50V, and the ratio $(t/T)=(v/V)=50/150=\frac{1}{3}$, that is a 33% duty cycle. The control system will automatically adjust the duty cycle to 33% when 110V AC is connected as the input. If the input voltage is lowered below 110V, then the duty cycle will automatically increase to accommodate the change. Similarly, if 220V is applied to the input, then the input DC voltage V may be about 300V, and the duty cycle will be adjusted automatically to 50/300=⅙. Thus, this design will automatically adapt to any input voltage within a reasonable range tolerated by the implemented electronics.

Let W be the total power dissipated in LEDs 240, the average current through LEDs 240 be I=W/v, and a ripple current percentage $\Delta I/I=((V-v)\ t\ v)/LW=((1/WL)\times(1-(v/V))\times(v^2/f))$, where f is the switching frequency. Therefore, $(L\times f)=(1/W(\Delta I/I))\times(1(1\le(v/V))\times(v^2)$. As an example for a design described herein, v=50, V=150, W=25, and assuming 10% ripple current, we get $(L\times f)=0.66\times10^3$. The following table shows different values of inductor 414 and associated switching frequencies that may be used with the design.

| Switching Freq f (MHz) | Inductance L of inductor 414 |
|---|---|
| 1 | 660 micro-Henry |
| 10 | 66 micro-Henry |
| 100 | 6.6 micro-Henry |

Note that as the frequency of operation is increased, the size of the inductor 414 decreases. Today's high performance electronics can easily switch at more than 100 MHz, and thus would require a very small inductor 414 of 6.6 micro-henry. In some embodiments, the converter is switched at a very high frequency to reduce the size of the inductor 414, so that the inductor 414 can be easily incorporated into the base of bulb connector 110 or even integrated into the electronics 130 itself, discussed below.

For example, a 6 micro Henry inductor 414 can be built with a ferrite core that is, for example, 5 mm long, with 5 mm diameter, and seven turns of copper wire—small enough to fit in the base of a conventional bulb as in FIG. 1. Such a small size of an inductor 414 is possible because of higher switching frequency.

There are several other ways to implement a small inductor 414 besides using a discrete ferrite core inductor mentioned above. The inductor 414 may be implemented as an "air core" discrete inductor 414, which may be slightly larger in size but nevertheless would fit in the base of the convention bulb connector 110. Inductor 414 may be based on a magnetic material or a non-magnetic material. Another method is to integrate inductor 414 on the printed circuit board or package substrate of the integrated controller 430. In this implementation, the inductor 414 may be formed by the signal traces on the board or on the package. High permeability magnetic material may be incorporated to reduce the size of the inductor 414 on the board or on the package. The inductor 414 may be implemented on a controller die (integrated circuit) as an integrated inductor with or without magnetic material. All these options are possible because the frequency of operation is high, allowing a smaller inductor 414 size. See FIGS. 15 and 16.

Figure 8:
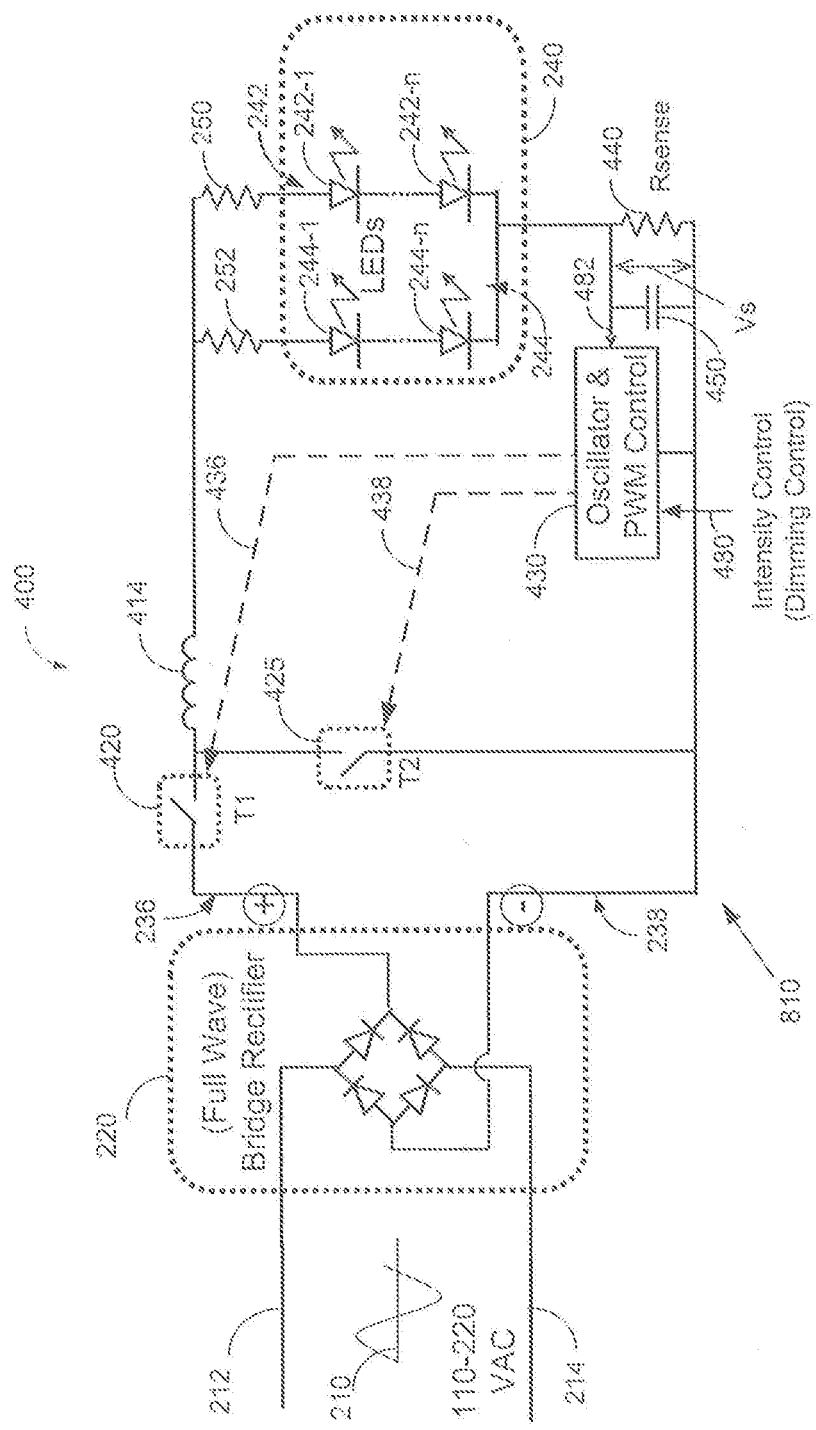
FIG. 8 is a block diagram of an LED based light system similar to that of FIG. 4 but without an inductor and certain capacitors according to some embodiments of the invention.

FIG. 8 illustrates power supply circuitry 800 including a switching regulator 810 which are similar to power supply circuitry 400 and switching regulator 410 except that inductor 230 and capacitors 460 and 470 are not included. Without the filter capacitors, the current is still direct current, but with a larger AC ripple than the circuit with the filter capacitors 460 and 470. The average current is controlled, however there are larger variations in current while the pulse width modulator might be operating as seen in FIG. 9.

Figure 9:
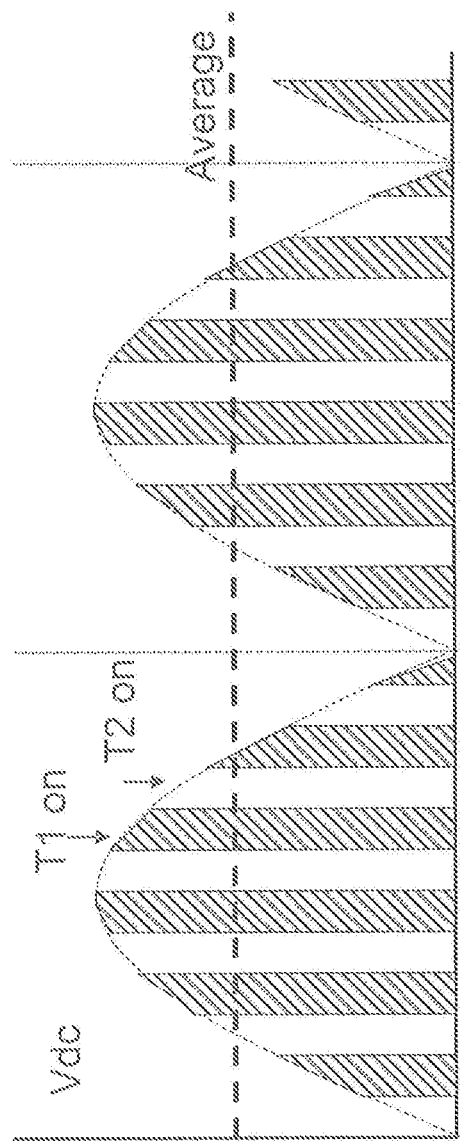
FIG. 9 is a diagram of a switching waveform for transistors that may be used with the systems of FIG. 8.

In the lighting application, vision persistence may be very large, and even if LEDs 240 receive current spikes as shown in FIG. 9, it's the average current (or RMS current) that determines the power dissipation and the perceived amount of light generated from the LED lighting system. This type of pulsed DC supply may not be suitable for other electronics, but may be good enough for the lighting applications. An advantage of eliminating capacitors 460 and 470 is reduced cost and possibly reduced sized making it easier to fit in the bulb connector 110.

In different embodiments, there are different possible levels of intensity to choose from. For example, in some embodiments, very fine grain changes in intensity and color can be made. In other embodiments with discrete levels of intensity control, there are fewer levels to choose from. In some embodiments, the changes in intensity are more or less continuous, while in other embodiments, there may be relatively few possible different intensity levels to choose from.

Figure 10:
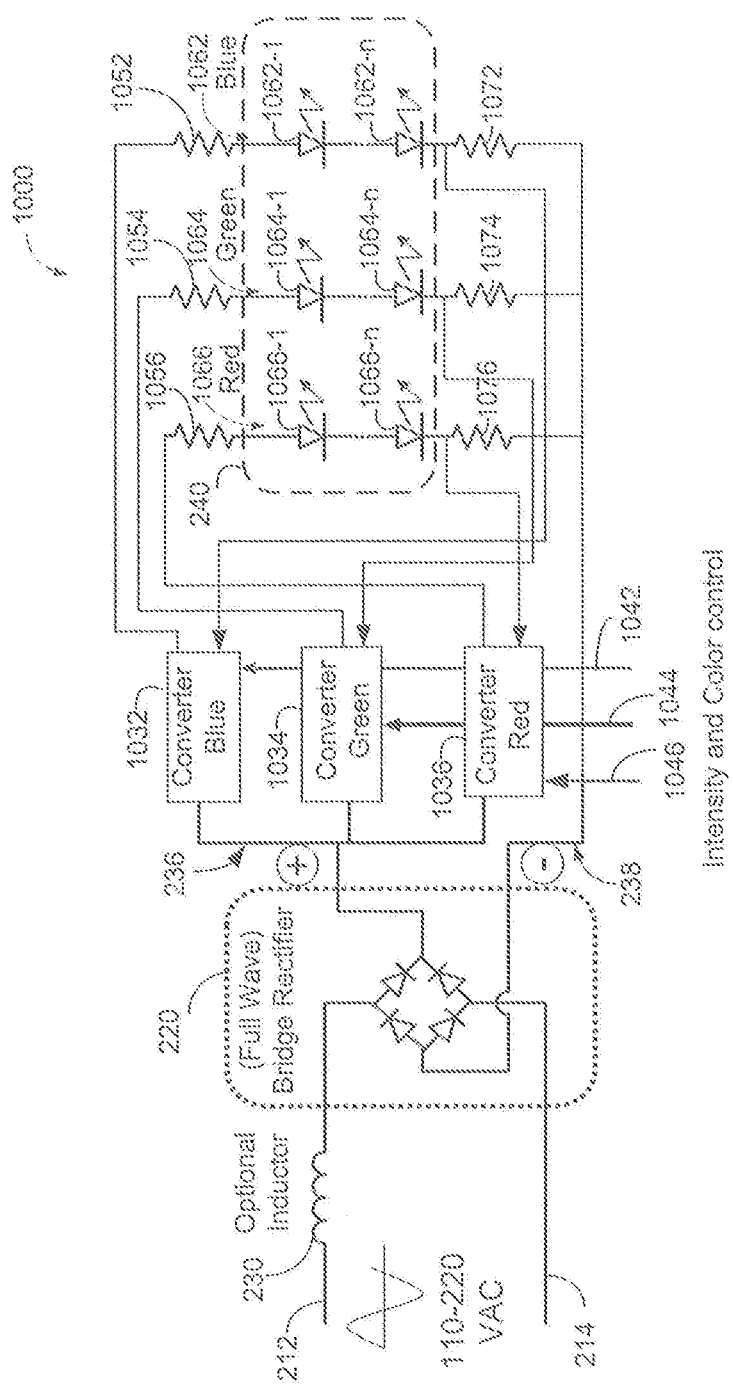
FIG. 10 is a block diagram of an LED based light system with multiple color and intensity control capabilities according to some embodiments of the invention.

FIG. 10 illustrates a system which is similar to that of FIG. 4 except that power supply circuitry 1000 includes three switching regulators (or switching converters) 1032, 1034, and 1036 for multiple colors (for example, blue, green, and red), and LEDs 240 includes different color LEDs, for example, blue LEDs 1062 (1062-1 . . . 1062-n), green LEDs 1064 (1064-1 . . . 1064-n), and red LEDs 1066 (1066-1 . . . 1066-n). Resistors 1072, 1074, and 1076 may be considered part of the switching regulators but are shown separately for illustration purposes. Although only one string of LEDs per color is shown, there may be more than one parallel string for a color. The LEDs may be interspersed in the light device or separated in the light device. There may be additional colors such as white LEDs. Ballast resistors 1052, 1054, and 1056 and sense resistors 1072, 1074, and 1076 are similar to resistors 250 and 440 in FIG. 4. Switching converters 1032, 1034, and 1036 may each include switching elements like switching elements 420 and 425 and switching controller circuitry 430 and capacitor 450 of FIG. 4, or be somewhat different than in FIG. 4. They may also include capacitors like capacitors 460 and 470.

System 1000 may use intensity and color control signals on conductors 1042, 1044, and 1046 for blue, green, and red colors respectively. Note that by changing relative intensity of different color LEDS or even turning off particular color LEDs, the overall intensity and overall color of the combined LEDs can be changed. The overall color might be kept the same by changing the intensity of all colors by the same amount, or the overall color may change by changing the intensity of different color LEDs by different amounts.

Figure 11:
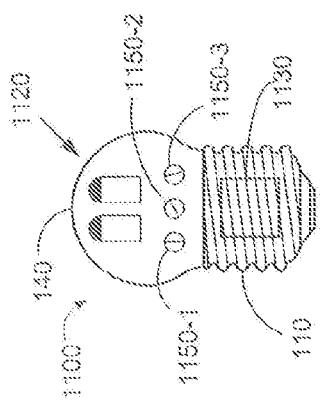
FIG. 11 is a diagram showing a light device including adjustable controls to control color and/or intensity according to some embodiments of the invention.

FIG. 11 shows a light device 1100 including a plurality of potentiometers 1150-1, 1150-2, and 1150-3, which may be used as resistor 724 of FIG. 7, to control the intensity of different ones of LEDs 1120. LEDs 1120 may represent LEDs 1062, 1064, and 1066, the intensity of which may be controlled by potentiometers 1150-1, 1150-2, and 1150-3, respectively. Power supply circuitry 1130 may be primarily inside bulb connector 110 but may include some circuitry such as potentiometers in bulb encapsulation 140. In other embodiments, there is only one potentiometer like 1150-1, 1150-2 or 1150-3, or two potentiometers, or more than three potentiometers. A support (like LED support 124) could be included in the devices of FIGS. 11-14 and the power supply circuitry could be partially or fully in or on the support like LED support 124.

Figure 12:
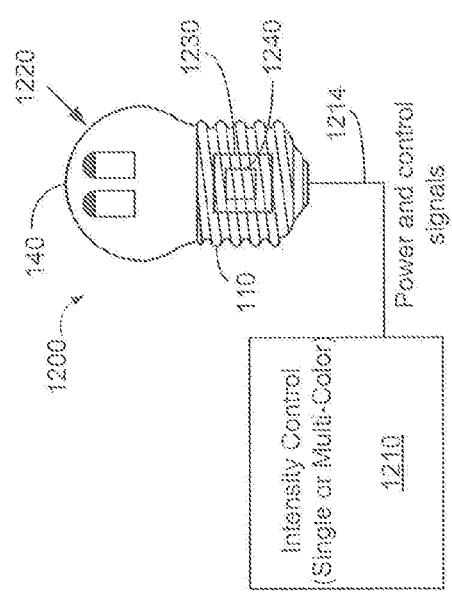
FIG. 12 is a block diagram of a light device and remote control communicating through a power line according to some embodiments.

FIG. 12 shows intensity control circuitry 1210 coupled to a light device 1200 through power conductor 1214. Light device 1200 includes LEDs 1220 which may include a single color or multiple colors of LEDs such as LEDs 1062, 1064, and 1066. If only a single color is used, that single color may be a white shade or different than white. Power supply circuitry 1230 controls the intensity of LEDs 1220 in response to control signals superimposed on the power signals from circuitry 1210 through conductors 1214. Extraction circuitry 1240 removes the intensity control signals from the power signal and provide the intensity control signals to the switching regulator. The intensity control signals may control LEDs of a single color or LEDs of multiple colors. Power supply circuitry 1230 may be completely within bulb connector 110 or it may be elsewhere such as partially within connector 110 and partially within bulb encapsulation 140, or completely within encapsulation 140. An internal intensity control signal can be responsive an external intensity control signal. For example, in some embodiments, extraction circuitry 1240 may pass on the external intensity control signal unchanged, and in other embodiments or extraction circuitry 1240 creates an internal intensity control in response to the external intensity control signal from power conductor 1214, but wherein the internal intensity control signal may be somewhat different than the external intensity control signal. Multiple internal intensity control signals may be responsive to a single external intensity control signal or to multiple external intensity control signals.

Figure 13:
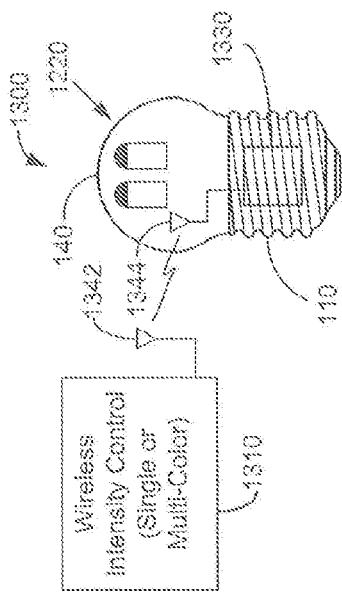
FIG. 13 is a block diagram of a light device and a wireless remote control according to some embodiments.

FIG. 13 shows intensity control circuitry 1310 wirelessly coupled to a light device 1300 through transmitter 1342 and receiver 1344. Light device 1300 includes LEDs 1320 which may include a single color or multiple colors of LEDs such as LEDs 1062, 1064, and 1066. Power supply circuitry 1330 controls the intensity of LEDs 1220 in response to control signals from control circuitry 1310. The intensity control signals may control LEDs of a single color or LEDs of multiple colors. The intensity control signals may be at radio frequency (RF) or infrared (IR) or at some other frequency. Various types of known wireless signal encoding techniques could be used to control the intensity. Power supply circuitry 1330 may be completely within bulb connector 110 or it may be elsewhere such as partially within connector 110 and partially within bulb encapsulation 140, or completely within encapsulation 140.

Figure 14:
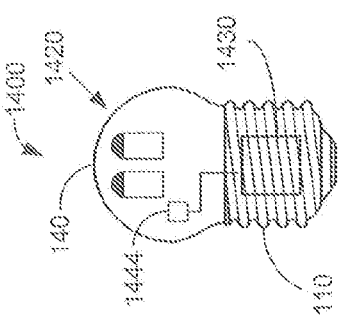
FIG. 14 is a block diagram of a light device according to some embodiments.

FIG. 14 shows a light device 1400 including an audio sensors 1444 to detect audio signals and provide signals in response to power supply circuitry 1430. An example of an audio signal may be clapping hands. Light device 1400 includes LEDs 1420 which may include a single color or multiple colors of LEDs such as LEDs 1062, 1064, and 1066. Power supply circuitry 1330 controls the intensity of LEDs 1220 in response to control signals from audio sensors 1444. Audio signals may control LEDs of a single color or LEDs of multiple colors. Power supply circuitry 1430 may be completely within bulb connector 110 or it may be elsewhere such as partially within connector 110 and partially within bulb encapsulation 140, or completely within encapsulation 140. Clapping hands to turn lights on or off is known, although the audio sensors are physically remote from the light device.

Other types of intensity control could be used. For example, there could be a conductor separate from the power conductor to carry control signals to a bulb.

Figure 15:
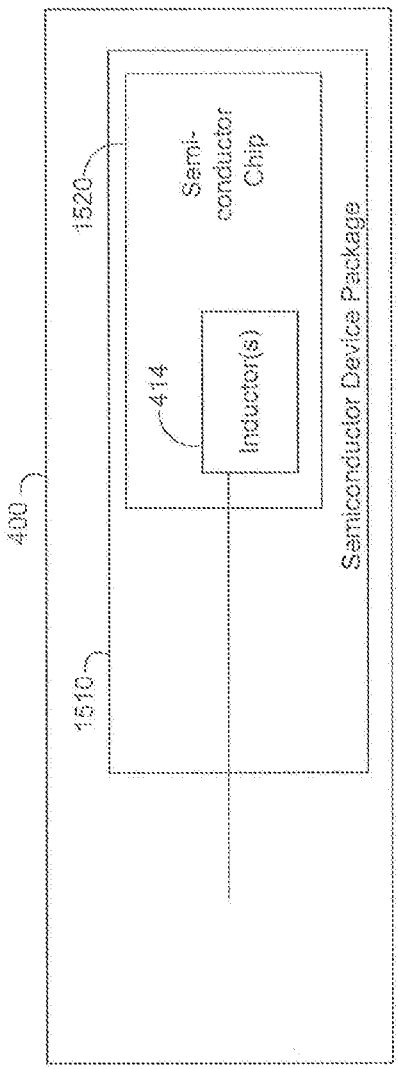
FIG. 15 is a block diagram of an on chip inductor according to some embodiments of the invention.

FIG. 15 shows inductor(s) 414 as part of a semiconductor chip 1520 in a package 1510 in power supply circuitry 400. In some embodiments, switching regulator 410 (with the possible exception of inductor(s) 414 as explained) is included in chip 1520 or chip 1620 discussed in connection with FIG. 16. Inductor(s) 414 may be fabricated as part of chip 1520 or merely placed on chip 1520.

Figure 16:
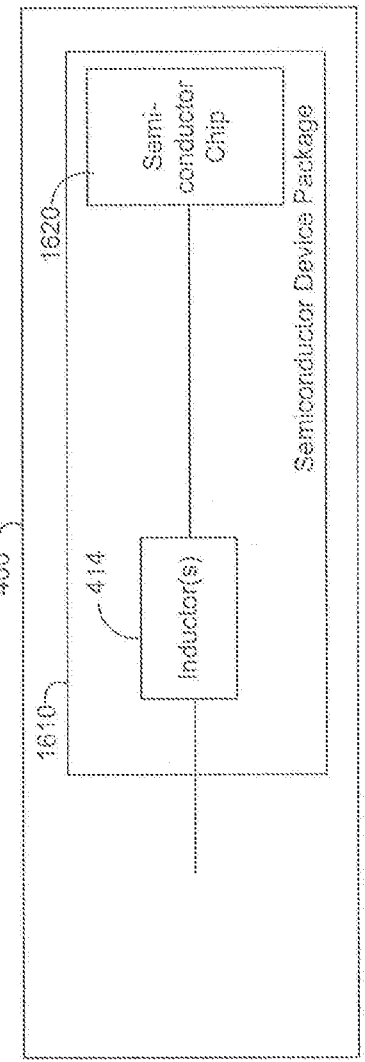
FIG. 16 is a block diagram of an on package inductor according to some embodiments of the invention.

FIG. 16 shows inductor(s) 414 as part of a package 1610 for a semiconductor chip 1620 in power supply circuitry 400. Inductor(s) 414 may be fabricated as part of package 1610 (for example, on interior layers of a package substrate) or merely placed on package 1610. Alternatively, inductor(s) 414 and other inductors such as 230 may be separate from the chip and package. For example, the inductor(s) could be part of or on a circuit board such as a printed circuit board (PCB).

The relatively sizes of objects as they appear in the figures are not intended to convey actual relative sizes.

In some embodiments, the received power is DC, so there is no need to convert from AC to DC.

Additional Information and Embodiments

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." Likewise, that A is responsive to B, does not mean it is not also responsive to C.

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element.

The invention is not restricted to the particular details described herein. Indeed, many other variations of the foregoing description and drawings may be made within the scope of the present invention. Accordingly, it is the following claims including any amendments thereto that define the scope of the invention.

What is claimed is:

1. A light device for generating light, comprising:
   light emitting diodes (LEDs);
   a power supply circuitry including at least one switching regulator including switching elements to provide power to the LEDs, wherein the LEDs include differently colored LED groups each including at least one LED of a given color;
   a switching control circuitry to independently control light intensities for the different LED groups to change an overall color of light generated by the light device; and
   a device support structure including a device connector and an LED support to support the LEDs, wherein the device connector is configured to mate with a light socket to provide power from the light socket to the power supply circuitry, and the power supply circuitry is included inside the device connector;

wherein the switching control circuitry is to independently control the light intensities for the different LED groups responsive to a change in at least one external intensity control signal;

wherein each of the at least one switching regulator includes an inductor coupled to the switching elements; and wherein the switching control circuitry includes:

a voltage reference circuit to generate a reference voltage based on the external intensity control signal;

a first comparator to compare the reference voltage to a sensed voltage that corresponds to a current through the respective LED group; and a second comparator to control at least one of a pulse width or frequency of a drive signal based on an output signal of the first comparator and an oscillation voltage signal received from an oscillator, wherein the drive signal is provided to the switching elements to control the switching elements and thereby control the intensity of the respective LED group.

2. The device of claim 1, further comprising a wireless receiver coupled to the switching control circuitry, the wireless receiver to wirelessly receive the at least one external intensity control signal.

3. The device of claim 1, wherein the device connector is of a standardized size.

4. The device of claim 3, wherein the power supply circuitry is included at least partially inside the device connector.

5. The device of claim 1, wherein there are more than one of the switching regulators and each of the switching regulators includes switching control circuitry separately to control intensity of different ones of the groups of LEDs.

6. The device of claim 1, wherein at least a portion of the switching regulator is included in a semiconductor chip.

7. The device of claim 6, wherein the inductor is formed in the chip.

8. The device of claim 6, further comprising a package substrate for the chip and wherein the inductor is formed in the package substrate.

9. The device of claim 6, further comprising a printed circuit board coupled to the chip and wherein the inductor is formed in the printed circuit board.

10. The device of claim 1, wherein the switching control circuitry is responsive to a change in the reference voltage.

11. The device of claim 1, wherein the reference voltage is responsive to at least one intensity control signal which is derived from the at least one external intensity control signal.

12. A light device for generating light, comprising:
light emitting diodes (LEDs); and
a power supply circuitry including alternating current (AC)-to-direct current (DC) conversion circuitry and a switching regulator including switching elements to provide power to the LEDs, wherein the switching regulator includes switching control circuitry to control switching of the switching elements to control an intensity of the LEDs, the switching control circuitry to control the intensity of the LEDs in response to at least one external intensity control signal; and
a wireless receiver coupled to the power supply circuitry, the wireless receiver to receive the at least one external intensity control signal from an external intensity control circuitry;

wherein the switching regulator includes an inductor coupled to the switching elements;

wherein the switching control circuitry includes:

a voltage reference circuit to generate a reference voltage based on the external intensity control signal;

a first comparator to compare the reference voltage to a sensed voltage that corresponds to a current through the LEDs; and a second comparator to control at least one of a pulse width or frequency of a drive signal based on an output signal of the first comparator and an oscillation voltage signal received from an oscillator, wherein the drive signal is provided to the switching elements to control the switching elements and thereby control the intensity of the LEDs.

13. The device of claim 12, comprising a device support structure including a device connector and a light emitting element support to support the LEDs.

14. The device of claim 13, wherein the device connector is one end of the device support structure, and the power supply circuitry is supported by the device support structure.

15. The device of claim 12, wherein the switching control circuitry is to control both switching pulse width and frequency to control the intensity of the LEDs.

16. The device of claim 12, wherein at least a portion of the switching regulator is included in a semiconductor chip.

17. The device of claim 16, wherein the inductor is formed in the chip, in a package substrate coupled to the chip, or in a printed circuit board coupled to the chip.

18. The device of claim 12, wherein the LEDs include different groups of LEDs and each group has a different color, and there are more than one of the switching regulators and the more than one of the switching regulators each include switching control circuitry to separately control intensity of different ones of the groups of LEDs.

19. A lighting system comprising:
an external intensity control circuitry to provide at least one external intensity control signal, the external intensity control circuitry including a wireless transmitter to transmit the at least one external intensity control signal; and
a light device for generating light, the light device including:
light emitting diodes (LEDs);
a wireless receiver to receive the at least one external intensity control signal; and
a power supply circuitry coupled to the LEDs and the wireless receiver, the power supply circuitry including:
input conductors to receive input power; and
a switching regulator coupled to the input conductors, the switching regulator including switching elements to provide power to the LEDs, wherein the switching regulators are to control switching of the switching elements, responsive to the at least one external intensity control signal, to control a brightness of at least some of the LEDs;

wherein the switching regulator includes an inductor coupled to the switching elements;

wherein the switching regulator further includes a switching control circuitry that includes:

a voltage reference circuit to generate a reference voltage based on the external intensity control signal;

a first comparator to compare the reference voltage to a sensed voltage that corresponds to a current through the LEDs; and a second comparator to control at least one of a pulse width or frequency of a drive signal based on an output signal of the first comparator and an oscillation voltage signal received from an oscillator, wherein the drive signal is provided to the switching elements to control the switching elements and thereby control the brightness of the at least some of the LEDs.

20. The system of claim 19, wherein the LEDs include different groups of LEDs, wherein each group of LEDs has LEDs of a different color from the other groups of LEDs, wherein the light device includes more than one of the switching regulators, and wherein individual switching regulators are to control intensity of respective different ones of the groups of LEDs.

21. The system of claim 19, wherein the switching control circuitry is to control switching pulse width and frequency of the drive signal provided to the switching elements to control the brightness of the at least some of the LEDs.

22. The system of claim 19, wherein the light device further includes a device support structure including a device connector and an LED support to support the LEDs, wherein the device connector is configured to mate with a light socket to provide power from the light socket to the power supply circuitry via the input conductors, and wherein the power supply circuitry is included inside the device connector.

* * * * *